(12) United States Patent
Babushkin

(10) Patent No.: US 11,615,133 B2
(45) Date of Patent: Mar. 28, 2023

(54) SHARING USER GENERATED CONTENT FOR MEDIA SEARCHES

(71) Applicant: Collective Vision Inc., Roswell, GA (US)

(72) Inventor: Igor Babushkin, Johns Creek, GA (US)

(73) Assignee: Collective Vision Inc., Roswell, GA (US)

( * ) Notice: Subject to any disclaimer, the term of this patent is extended or adjusted under 35 U.S.C. 154(b) by 0 days.

(21) Appl. No.: 17/323,254

(22) Filed: May 18, 2021

(65) Prior Publication Data

US 2022/0374466 A1 Nov. 24, 2022

(51) Int. Cl.
*G06F 3/048* (2013.01)
*G06F 16/532* (2019.01)
*G06F 16/538* (2019.01)
*G06F 3/04842* (2022.01)

(52) U.S. Cl.
CPC ........ *G06F 16/532* (2019.01); *G06F 3/04842* (2013.01); *G06F 16/538* (2019.01)

(58) Field of Classification Search
None
See application file for complete search history.

(56) References Cited

U.S. PATENT DOCUMENTS

2015/0248719 A1* 9/2015 Hansen ................. G06F 3/0304
705/26.63

* cited by examiner

*Primary Examiner* — William C Trapanese
(74) *Attorney, Agent, or Firm* — Thomas | Horstemeyer, LLP

(57) ABSTRACT

Disclosed are various embodiments for generating a search results interface for sharing user content for subsequent media searches of a physical object. In one example, a system comprises machine readable instructions stored in the a memory of a client device. The instructions cause the client device to at least transmit to a computing device a request for an image search of an object. The request comprises an image of the object. An image result is received from the computing device in response to the request for the image search. The instructions cause the client device to display an image search results interface. The image search results interface includes an image result from the image search and an upload user interface component. The upload user interface component is configured to display an input interface for uploading user content associated with the object in the image result.

20 Claims, 9 Drawing Sheets

SHARING USER GENERATED CONTENT FOR MEDIA SEARCHES

BACKGROUND

Media searches provide another tool that enables users to find content for an object by using a media item that has the object as the search input. Accordingly, a user can perform a search for an object in a media item without having to use text to describe the object. For example, a user can provide an image of a piece of furniture to search for other similar furniture items found in media items. However, these media searches provide search results of the media items with limited content. Accordingly, an improved system and method for sharing user generated content for media searches is needed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
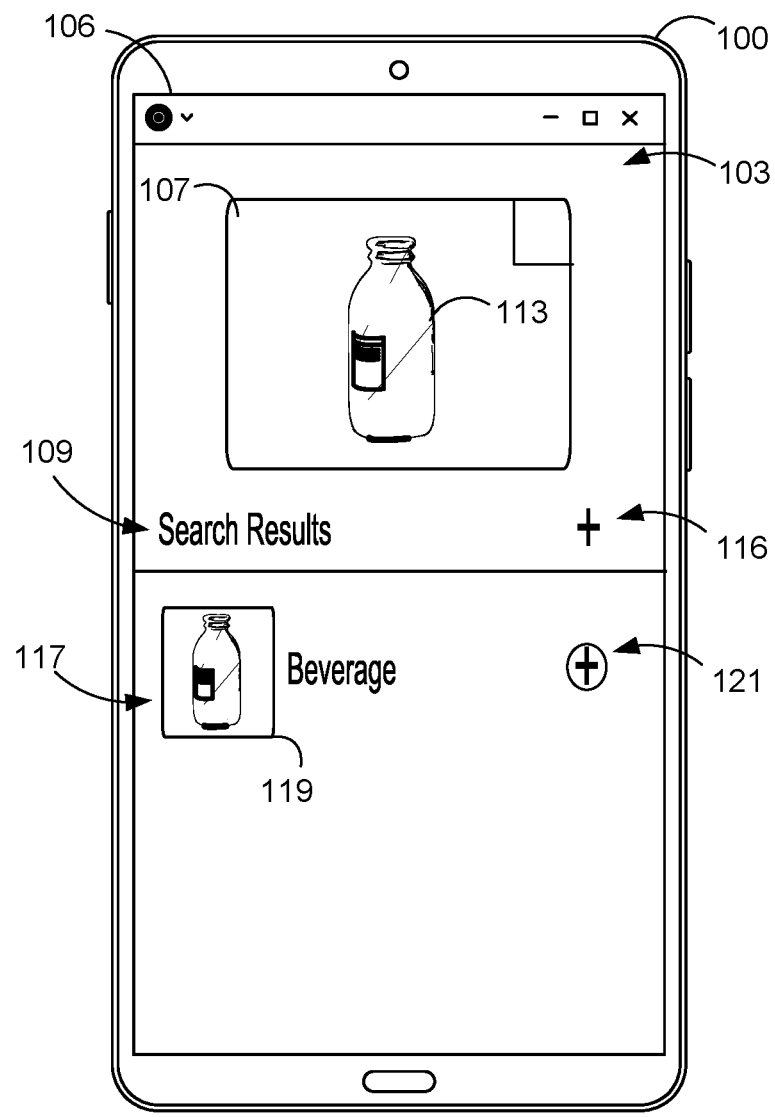
FIGS. 1A-1C are pictorial diagrams of example user interfaces rendered by a client device according to various embodiments of the present disclosure.

Disclosed are various embodiments related to generating a search results interface for sharing user content for subsequent media searches of a physical object. The search results interface displays media files or data streams identified based at least in part on a search for a physical object contained within a media file.

Users may take a photograph or capture a video that includes a physical object. Users can then select the physical object to initiate a search for available media files or data streams (e.g., images, video, text, etc.) related to the selected physical object. A search results interface can include one or media files that have been identified from the search of the object. The search results interface can include a user interface component (e.g., a button) that is configured to display an input interface for receiving user content associated with the media files in the search results interface. Subsequently, a different user that performs a search of the same or similar physical object can access the user content uploaded by the previous user. As such, the various individuals can create and upload content that can be discovered by other individuals that execute a subsequent search for a media file that includes a particular object.

For example, if a user took a picture of a can of "Lemon-Lime Soda," then any media files or data streams related to "Lemon-Lime Soda" would be returned to the user. Likewise, a user could upload user content and link or associate (e.g., "tag") the user content with the media files or data streams returned for the "Lemon-Lime Soda" object. For instance, a user could capture and upload an image of their can of "Lemon-Lime Soda", thereby allowing the user's captured image or video to be surfaced to other users searching for media files related to "Lemon-Lime Soda."

The search results interface can display a user interface component (e.g., an upload content button) for uploading the user content. The user interface component is displayed in association with the search results of the media files or data streams. Accordingly, upon reviewing the media files in the search results interface, the user can select the user interface component to upload user content to be stored in association with the media files or data streams for the object. In the following discussion, a general description of the system and its components is provided, followed by a discussion of the operation of the same.

As one skilled in the art will appreciate in light of this disclosure, certain embodiments may be capable of achieving certain advantages. For example, the embodiments may be capable of an improved user interface design by having an upload user interface component displayed on the same interface (e.g., mobile application user interface, network page, etc.) as the search results from a visual search of an object. The embodiments may be capable of the improved user interface reducing the number of user interfaces that a user has to navigate to in order to upload user content for the search results of a visual search. Additionally, the embodiments may be capable of an improved input interface that enables the user to share or upload a variety of different content for the visual search results of an object, and the improved input interface may enable the adjustment of various settings (e.g., sharing methods, search triggers for an object) for the user content from a single interface.

With reference to FIG. 1A, shown is a pictorial diagram of an example user interface rendered by a client device 100. FIG. 1A illustrates a first example of a search results interface 103 on a display 106 of the client device 100. The search results interface 103 includes a cropped media file 107 and a search results area 109. The cropped media file 107 can be generated from a media file received or captured by the client device 100. An object 113 in the media file is identified and the media file is cropped to focus on the identified object 113. The search results area 109 can include an upload user interface (UI) component 116 and search results items 117. The upload UI component 116 is configured for uploading user content in association with the search results items 117 identified from the search of the object 113. The upload UI component 116 can be selected in order for the user to upload content, such as text, media items (e.g., an image file, a video file, an audio file), hyperlinks, and other suitable material. After the content has been uploaded, the uploaded content can appear in the search results of subsequent users executing a search based at least in part on the object 113.

The search results items 117 can represent one or more media items 119 that have been identified from the search to contain the object 113, a similar object, and other material related to the object 113. In FIG. 1A, a single media file has been identified from the search based at least in part on the object 113. The search results interface 103 can also include an edit object component 121. The edit object component 121 is configured to allow the creator of the object 113 to edit various settings. For example, a user can edit the search triggers (e.g., images used to describe an object), text descriptors, and other suitable components.

Figure 1B:
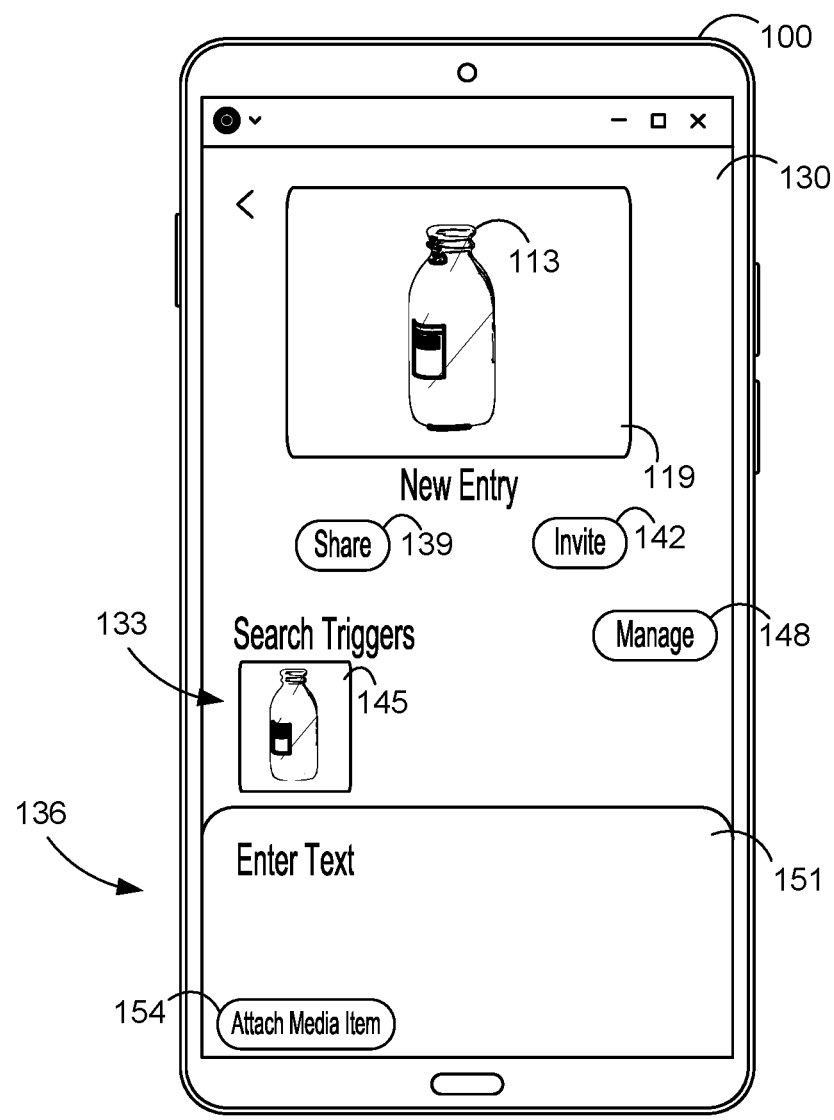

Next, with reference to FIG. 1B, shown is a pictorial diagram of an example user interface rendered by the client device 100. FIG. 1B illustrates an input interface 130 that is displayed upon a selection of the upload UI component 116 (FIG. 1A) from the search results interface 103. In some embodiments, upon selecting the upload UI component 116, a user interface prompt can be displayed to name the entry for the user content. In FIG. 1B, the entry name has been entered as "New Entry." The media item 119 from the search result is displayed near the top. The input interface 130 also includes a share component 139 for sharing the content entry with other user accounts established on an application platform. Additionally, the input interface 130 includes an invite component 142 for sharing the content entry with other users that do not have a user account on the application platform.

The input interface 130 also includes a search trigger area 133 and a content entry area 136. The search trigger area 133 includes a search trigger media item 145 and a manage component 148. The search trigger media item 145 represents one or more media files that have the object 113. The media files can be used as a basis for generating various descriptors for the object 113, and these descriptors can be used execute the search for the object 113. The manage component 148 can be configured to add or remove media items 119 that include the object 113. A user may select the manage component 148 in order to add different views of the object 113. For example, if the object 113 is a car in the media item 119, the user may select the manage component 148 in order to add different views of the exterior and/or the interior of the car. The different views can be used for providing search results of the car object 113.

The content entry area 136 includes a text window 151 and an attachment component 154. The text window 151 can be used for entering structured or unstructured text, a hyperlink, and other suitable text. In some embodiments, the hyperlink provided may be from a hyperlink to a media item (e.g., an image or a video) posted on a website, such as a social media platform. The attachment component 154 can be configured to upload an image file, a video file, an audio file, and other suitable media content.

After the user has uploaded the content, the content can be stored in association with the object 113 for subsequent users to have access in their search results for the object 113. As such, the upload UI component 116 enables the transition from the search results interface 103 to the input interface 130, which provides for a simpler user experience for uploading content related to the search results of an object 113 than having to navigate through various user interfaces or a variety of different applications, such as when a user may have to switch from one application to another or one user interface to another.

Figure 1C:
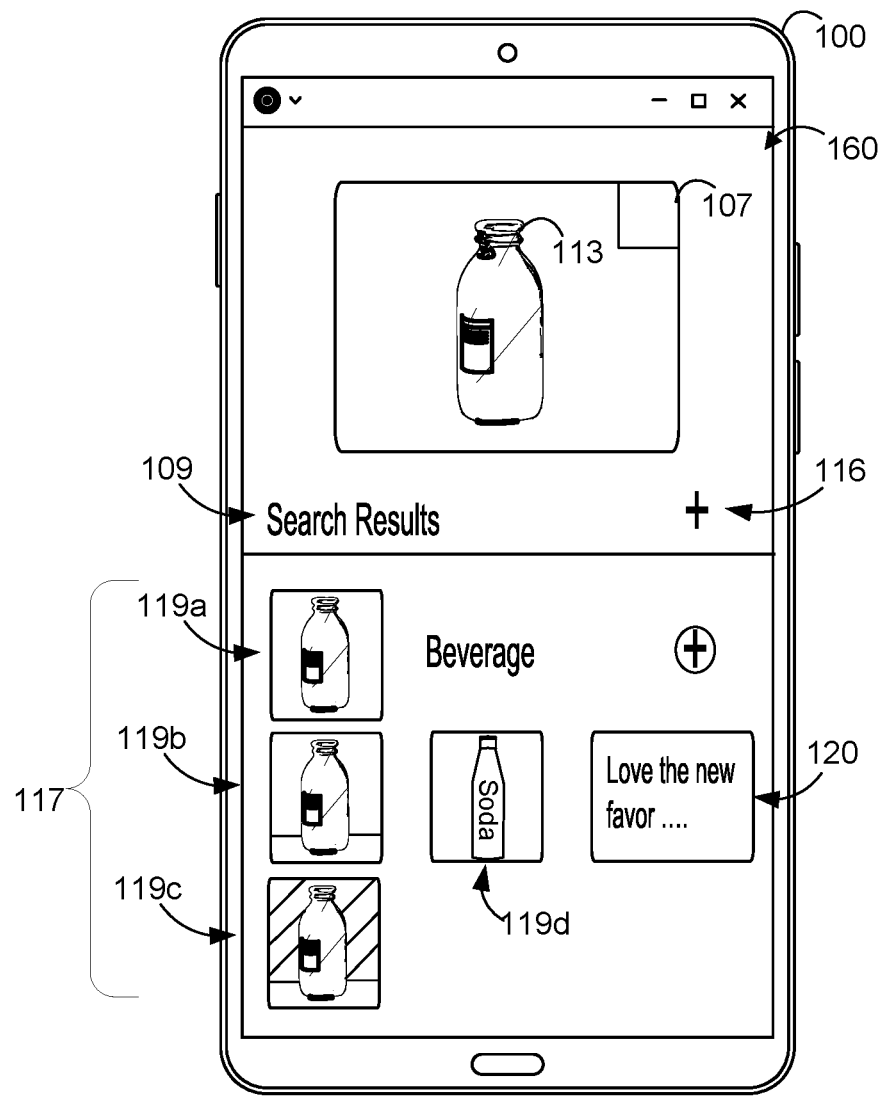

Moving on the FIG. 1C, shown is a pictorial diagram of an example user interface rendered by the client device 100. FIG. 1C illustrates an example of a second search results interface 160 on the client device 100. In FIG. 1C, the user content from FIG. 1B has been uploaded and is available to be accessed by a subsequent user. Accordingly, the second search results interface 160 includes user content that was uploaded from the input interface 130 by a previous user.

As illustrated in FIG. 1C, the second search results interface 160 includes search results 109 with various search results items 117. The search results items 117 which can include multiple media items 119a-119d and one or more user reviews 120. In one example, the new media items 119b-119d and the user review 120 may have been uploaded by the input interface 130. Additionally, a portion of the user review 120 is shown.

In some embodiments, the media items 119 can be configured in different arrangements. For example, the media items 119 displayed in FIG. 1C are arranged in a media item collage. In other examples, the media items 119 can be arranged in a continuous feed, in which the media items are in a single vertical column, in which the user can scroll up or down to view additional media items. Also, in FIG. 1C, the new media items 119b-119d can represent a cropped image of a larger media item displayed at a website (e.g., a product page, a social media post, etc.).

In some examples, the search results items 117 can be arranged, sorted, or filtered according to various criteria. For example, the criteria can include filtering or prioritizing based at least in part on most likes (e.g., received from a social media platform), popularity, relevancy, most views, most recent, closest location of the search results items 117 to the client device 100, and other suitable factors. Third party metadata associated with the search results items 117 can be received in order to filter, sort, or arrange the search results items 117 based at least in part on one or more factors. For example, website metadata from retailers, social media platforms, and other websites can provide metadata associated with the media items 119.

For example, the media item 119b and media item 119c may represent images from social media posts. The media item 119b may have received a larger quantity of likes from a social media platform than the media item 119c. As a result, the media item 119b is displayed higher than the media item 119c.

Figure 2:
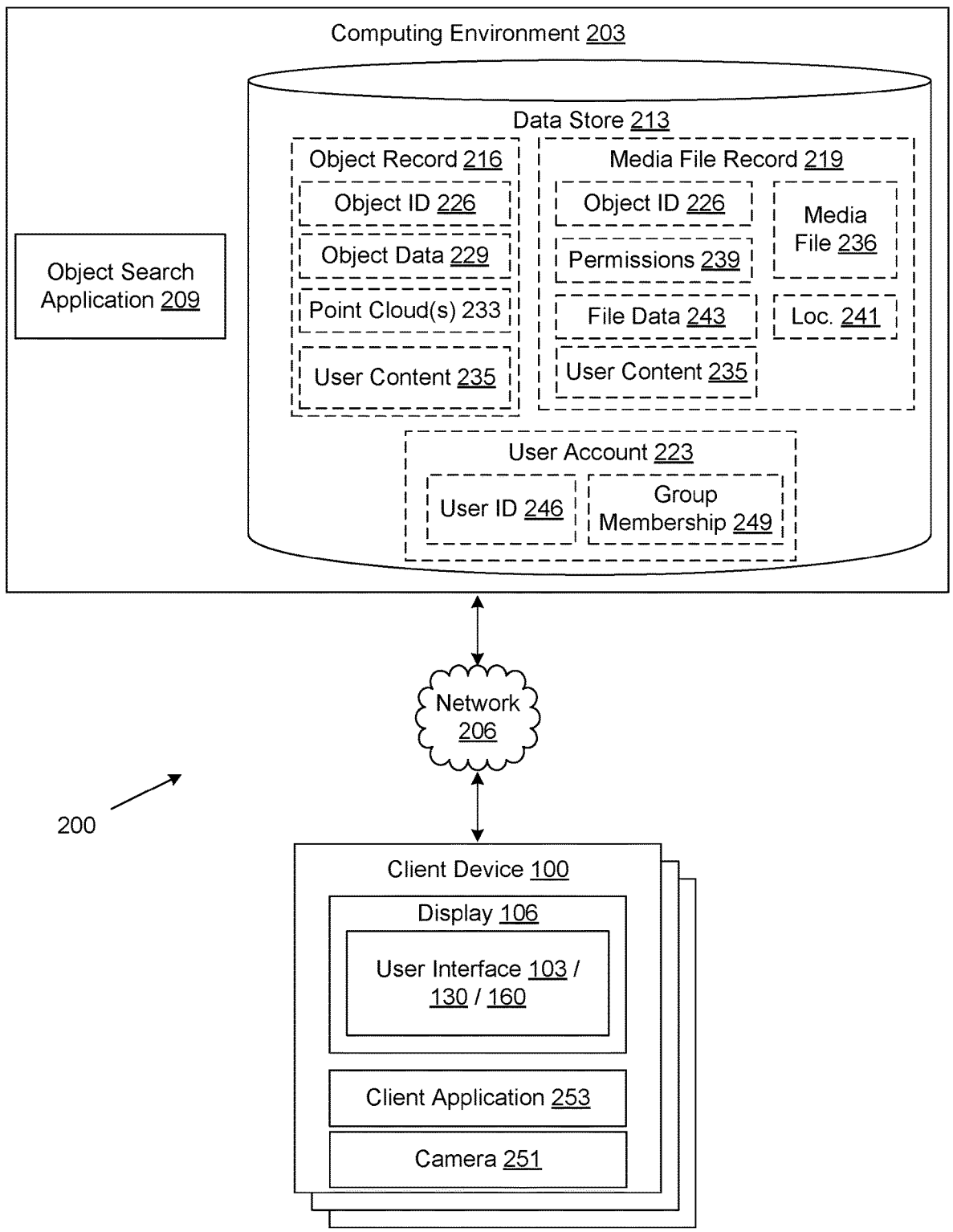
FIG. 2 is a drawing of a networked environment according to various embodiments of the present disclosure.

With reference to FIG. 2, shown is a networked environment 200 according to various embodiments. The networked environment 200 includes a computing environment 203 and a client device 100, which are in data communication with each other via a network 206. The network 206 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource, or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include an object search application 209, and other applications, services, processes, systems, engines, or functionality not discussed in detail herein.

The object search application 209 is executed to identify objects 113 (FIG. 1A) in image or video files and search for files related to the identified objects 113. Accordingly, the object search application 209 may rely on various computer vision and object identification techniques to identify unique objects 113 in an image or video file. The object search application 209 may then search for related files using one or more of the various techniques further described herein. The object search application 209 may also be configured, in some embodiments, to allow users to upload files to the data store 213, link the file to one or more objects 113, and set various permissions identifying which other users are permitted to view, consume, or otherwise access the uploaded file.

Various data is stored in a data store 213 that is accessible to the computing environment 203. The data store 213 may be representative of a plurality of data stores 213, which can include relational databases, object-oriented databases, hierarchical databases, hash tables or similar key-value data stores, as well as other data storage applications or data structures. The data stored in the data store 213 is associated with the operation of the various applications or functional entities described below. This data can include object records 216, media file records 219, user accounts 223, and potentially other data.

The object record 216 represents information that is related to or describes an object 113. Accordingly, the object record 216 can include an object identifier 226, object data 229, one or more point clouds 233, and user content 235. Other data may also be stored in the object record 216 as required by various embodiments of the present disclosure.

The object identifier 226 corresponds to a primary key that allows the object record 216 to be uniquely identified in the data store 213 by the object search application 209. An example of an object identifier 226 would include a numeric identifier generated when the object record 216 is initially created. If sequential numbers were used, this would allow for each object record 216 to have a unique object identifier 226.

The object data 229 represents information about the object 113. Object data 229 can include, for example, the name of the object 113, the owner of the object 113 (e.g., property owner), notes or facts about the object 113, the price of the object 113 (e.g., consumer goods), ratings or reviews of the object 113 (e.g., ratings of goods by other users), and any other data appropriate for the particular object 113 corresponding to the object record 216. Object data 229 may be added to the object record 216 when the object record 216 is first created, or it may be updated by one or more users at a later point in time. In some embodiments, limits may be placed on which user accounts 223 are allowed to modify the object data 229.

The point clouds 233 represent collections of points that define the shape or contour of an object 113. Multiple point clouds 233 may be stored within an object record 216 to represent different views of the same object 113 (e.g., views from different angles or perspectives). The object search application 209 can use a point cloud 233 stored in an object record 216 to determine whether an object 113 in an image or video is the same as an object 113 corresponding to the object record 216.

The user content 235 represents content that is uploaded by the user to be associated with an object 113 in a media file 236 from the visual search results. For instance, upon a display of search results from the visual search, the user of the client device 100 can add their own content to one of the media items 119 in the search results. Subsequent users can view the user content 235 upon performing a visual search for the object 113. The user content 235 can include user generated text, media files 236 (e.g., image file, video file, audio file, etc.), hyperlinks, and other suitable user-generated content.

The media file record 219 represents information that is related to or describes a media file 236 related to an object record 216 for a particular object 113. The media file 236 can represent either a discrete file, a data stream, or a combination thereof. Accordingly, references to the term media file 236 can include references to a file, a data stream, or a combination thereof as may be appropriate for a particular implementation. The media file record 219 can include an object identifier 226 for the corresponding object record 216 of each object 113 identified as present in the media file 236. Accordingly, if multiple objects 113 are identified as present in the media file 236, then multiple object identifiers 226 may be stored as part of the media file record 219. The media file record 219 may also include one or more permissions 239, one or more locations 241 linked to or associated with the media file 236, and file data 243.

The permissions 239 of the media file record 219 define which user accounts 223 are permitted to access or interact with the media file 236 and the manner in which access or interaction is permitted. For example, the permissions 239 may specify which user accounts 223 are allowed to view or consume the media file 236, which user accounts 223 are allowed to modify the media file 236, which user accounts 223 are allowed to remove or delete the medial file 236 and/or the corresponding media file record 219. Other permissions 239 may also be specified as appropriate for particular embodiments of the present disclosure. In some instances, the permissions 239 may be applied to individual user accounts 223 or groups of user accounts 223 (e.g., a "Public" or "Everybody" group encompassing all users, a "family" group comprising user accounts 223 belonging to a group of users that are members of the same family, etc.).

The location 241 can represent geographic information about the media file record 219. For example, the location 241 can be used to store information about where the media file 236 was created, a location 241 to be associated with a media file 236 (e.g., associating the city of Washington, D.C. with a media file 236 depicting the Washington Monument), or similar information. One or more locations 241 can also be stored in the media file record 219. For example, a media file record 219 could include the actual coordinates for the Washington Monument, the geohash or geocode representing the National Mall, and a geohash or geocode representing the city of Washington, D.C. itself.

File data 243 represents metadata about the media file 236 itself. Such metadata can include the name of the media file 236, the type of file (e.g., image, video, etc.), the format of the media file 236 (e.g., MPEG-4 video encoding, JPEG image, etc.), the size of the media file 236, the date the media file 236 was created, the date the media file 236 was last modified, or the date that the media file 236 was uploaded. Other information may also be stored within the file data 243 as may be appropriate for particular embodiments of the present disclosure.

User accounts 223 represent individual users of the object search application 209. Each user account 223 may generally correspond to one user (e.g., an individual or an organization), although a user may have multiple user accounts 223 (e.g., a personal and a professional account). Accordingly, a user account 223 may include a user identifier 246, information about the group membership 249 of the user account 223, and potentially other information.

The user identifier 246 represents a unique identifier that allows for a user account 223 to be distinguished from other user accounts 223. In some implementations, this may correspond to a username selected by a user when the user account 223 is first created. In other implementations, the user identifier 246 may be automatically generated (e.g., a sequential number). In some implementations, multiple user identifiers 246 may be used for efficiency purposes. For example, some implementations may rely on a username to represent the user account 223 to other users while using an automatically assigned number when checking for applicable permissions 239, which increases the speed of the check by relying on simpler integer operations of the computing device.

The group membership 249 lists all of the groups of user accounts 223 for which the specific user account 223 is a member. A user account 223 may belong to one, none, or multiple groups, each of which may be granted various permissions.

The client device 100 is representative of a plurality of client devices that may be coupled to the network 206. The client device 100 may include, for example, a processor-based system such as a computer system. Such a computer system may be embodied in the form of a personal computer (e.g., a desktop computer, a laptop computer, or a similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 100 may include one or more displays 106, such as liquid crystal displays (LCDs), gas plasma-based flat panel displays, organic light emitting diode (OLED) displays, electrophoretic ink ("E-ink") displays, projectors, or other types of display devices. In some instances, the display 106 may be a component of the client device 100 or may be connected to the client device 100 through a wired or wireless connection. Additionally, the client device 100 can include a camera 251 for capturing images and/or video of an object 113 for a visual search.

The client device 100 may be configured to execute various applications such as a client application 253 or other applications. The client application 253 may be executed in a client device 100, for example, to send one or more media files 236 to the object search application 209 to initiate a search for related media files 236 or to add the media file 236 to a media file record 219 in the data store 213. To this end, the client application 253 may include, for example, a browser, a dedicated application, or other executable software that can cause a user interface 103/130/160 to be rendered on the display 106. The user interface 103/130/160 may include a network page, an application screen, or other user mechanism for obtaining user input or presenting output to the user. The client device 100 may be configured to execute applications beyond the client application 253 such as, for example, email applications, social networking applications, word processors, spreadsheets, or other applications.

Next, a general description of the operation of the various components of the networked environment 200 is provided. It should be noted that this general description is meant to serve to illustrate the principals of the present disclosure. One or more features described in this general description may or may not be present in any particular embodiment of the present disclosure.

To begin, a user may capture an image or video of an object 113 and save the captured image or video as a media file 236. In some instances, the location 241 where the media file 236 was created may also be recorded. For example, the user may use the client application 253 to cause his or her mobile device to capture an image of a bottle of juice. The client application 253 may then prompt the user to upload the media file 236 and save it to the data store 213. Assuming the user choses to upload the media file 236, the client application 253 then sends the media file to the object search application 209.

The object search application 209 then uses one or more computer vision techniques to recognize individual objects 113 within the media file 236 and generate a corresponding point cloud 233 for each identified object 113. The object search application 209 then searches the object records 216 within the data store 213 to determine whether any object records 216 include a point cloud 233 that matches one or more of the point clouds 233 generated from the media file 236. The object search application 209 can then send object data 229 and the object identifier 226 for each matching object record 216 to the client application 253.

After matching media files 236 have been identified, the object search application 209 can transmit the matching media files 236 to the client device 100. The client application can display the search results interface 103, which can include the matching media files 236 in the search results area 109. The search results interface 103 can also include the upload UI component for uploading user content.

For example, assuming the user takes a picture of a bottle of "Farm Fresh Juice" and performs a search based at least in part on the "Farm Fresh Juice" bottle as the object 113, the search results interface 103 can display one or more media items 119 that include the "Farm Fresh Juice" bottle.

At this point, the user can select the upload UI component 116 to upload user content 235 for the search results items 117 associated with the "Farm Fresh Juice" bottle. The client application 253 can display an input interface 130 for receiving the user content 235. For example, the user may enter text for a user review, such as "Love this new favor by the juice company." The user may also upload a media file 236 (e.g., an image or video file) by selecting the attachment component 154. The uploaded user content 235 may be a picture or a video taken by the user of their bottle. The client application 253 can transmit or upload the media file 236 and the text to the object search application 209. After the user content 235 (e.g., the media item 119 and the text) has been uploaded, the object search application 209 can store the user content 235 in association with the "Farm Fresh Juice" bottle object 113. As such, the user content 235 is stored in association with the object 113, such as with the object record 216 and/or the media file record 219 of the "Farm Fresh Juice" bottle.

Subsequently, a different user can perform a second search based at least in part on the media file 236 that includes the "Farm Fresh Juice" bottle. The object search application 209 can transmit search results items 117 to the client application 253 of a second client device 100. The client application 253 can display a second search results interface 160 that includes the search results items 117 and the user content 235 uploaded by the previous user of the first client device 100.

Figure 3A:
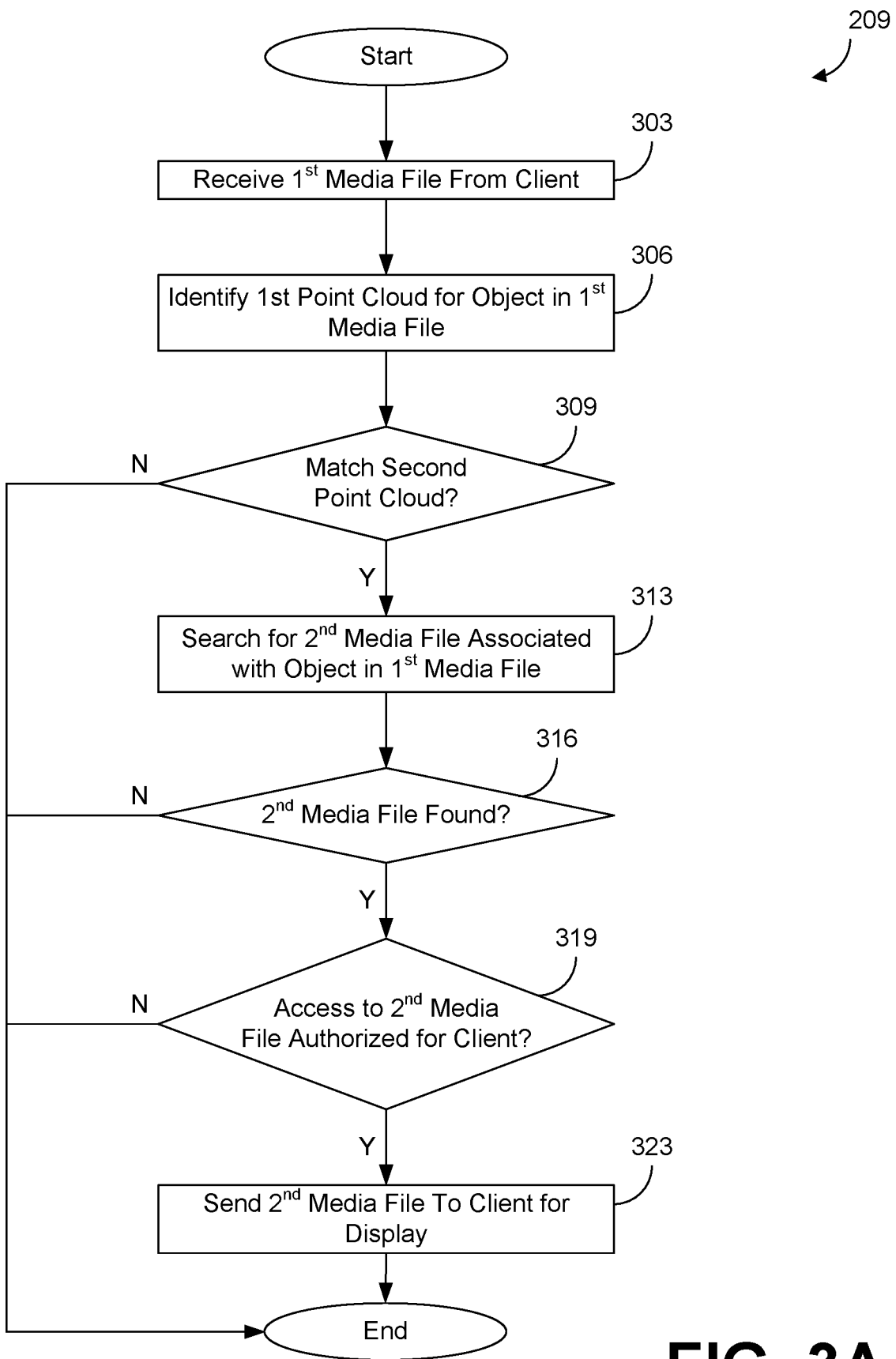
FIGS. 3A-3C are flowcharts illustrating examples of functionality implemented as portions of an application executed in a computing environment in the networked environment of FIG. 2 according to various embodiments of the present disclosure.

Referring next to FIG. 3A, shown is a flowchart that provides one example of the operation of a portion of the object search application 209 according to various embodiments. It is understood that the flowchart of FIG. 3A provides merely an example of the many different types of functional arrangements that may be employed to implement the operation of the portion of the object search application 209 as described herein. As an alternative, the flowchart of FIG. 3A may be viewed as depicting an example of elements of a method implemented in the computing environment 203 (FIG. 2) according to one or more embodiments.

Beginning with box 303, the object search application 209 receives a first media file 236 (FIG. 2) from a client device 100 (FIG. 2). For example, a client application 253 executing on the client device 100 may make use of one or more functions made available by the object search application 209 through an application programming interface (API) to upload the first media file 236 to the object search application 209.

Proceeding to box 306, the object search application 209 uses one or more computer vision techniques to identify individual objects 113 within the first media file 236. For example, the object search application 209 may use various feature detection approaches such as edge detection, corner detection, blob detection, ridge detection, affine invariant feature detection, or similar approaches to identify a collection of features that define an object. This collection of features could include a point cloud 233, a collection of edges, a collection of corners, or similar grouping of features that can be used to uniquely identify the object 113 from other objects 113 in the first media file 236.

Moving on to box 309, the object search application 209 determines whether the collection of features of an object 113 in the first media file 236 matches a collection of features of a known object 113. For example, if the object search application 209 identifies a point cloud 233 of a first object 113, the object search application 209 may determine whether the point cloud 233 matches a second point cloud 233 stored in an object record 216 corresponding to a known object 113. If no match is found, execution ends. However, if a match is found, execution can instead proceed to box 313.

Referring next to box 313, the object search application 209 may search for one or more media files 236 related to the identified object 113. For example, the object search application 209 can determine whether the object identifier 226 of the object record 216 matching the identified object 113 matches the object identifiers 226 stored in any media file records 219. Proceeding next to box 316, the object search application 209 determines whether a second media file 236 related to the object 113 identified in the first media file 236 has been found. If a match is found, then execution can proceed to box 319. Otherwise, execution may end.

Moving on to box 319, the object search application 209 may then check one or more permissions 239 of the media file record 219 to determine whether the client device 100 or a user account 223 (FIG. 2) associated with the client device 100 is allowed to access (e.g., view, edit, share, etc.) the matching media file 236. For example, the object search application 209 may determine whether the client device 100 or the user account 223 associated with the client device 100 is explicitly listed as having permission to access the media file 236. Likewise, the object search application 209 may also check whether the client device 100 or the user account 223 is included in a group of client devices 100 or a group of user accounts 223 that is listed as having permission to access the media file 236. If the client device 100 or the user account 223 associated with the client device 100 or the user account 223 associated with the client device 100 has permission to access the media file 236, then execution proceeds to box 323. Otherwise, execution of the process may end.

Referring next to box 323, the object search application 209 sends the second media file 236 to the client application 253 executing on the client device 100. In some embodiments, execution of this process may end. However, in other embodiments, one or more of the previously described steps may be repeated. For example, portions of the previously described process may be repeated in order for the object search application 209 to search for multiple media files 236 that may be related to the object 113 identified in the first media file 236.

Figure 3B:
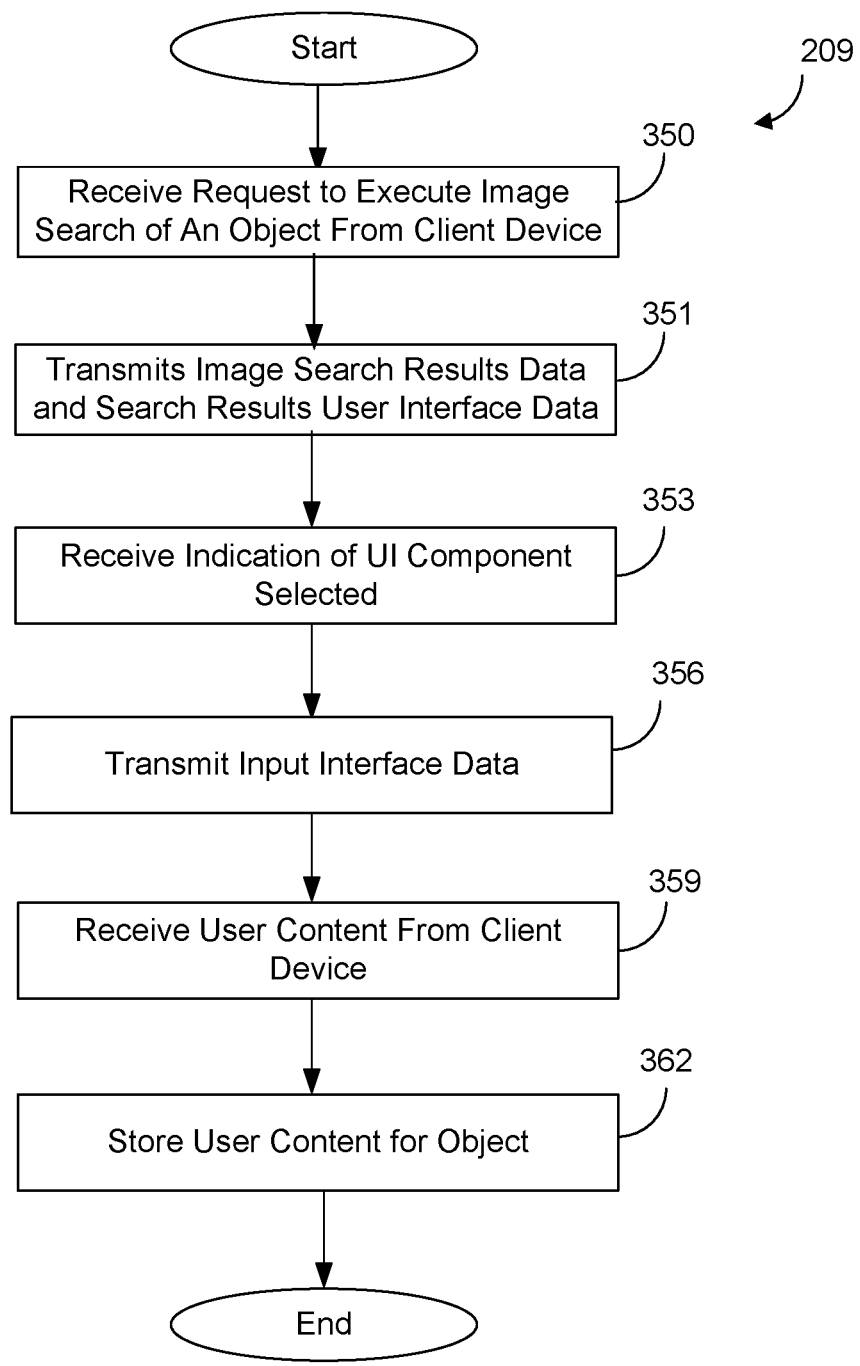

Referring next to FIG. 3B, shown is a flowchart that provides one example of the operation of a portion of the object search application 209 according to various embodiments. The flowchart of FIG. 3B provides an example of functionality related to displaying a search results interface 103/160 (FIGS. 1A and 1C). It is understood that the flowchart of FIG. 3B provides merely an example of the many different types of functional arrangements that may be employed to implement the operation of the portion of the object search application 209 as described herein. As an alternative, the flowchart of FIG. 3B may be viewed as depicting an example of elements of a method implemented in the computing environment 203 (FIG. 2) according to one or more embodiments.

Beginning with box 350, the object search application 209 can receive a request to execute a visual search for an object 113 identified in a media file 236. The process for executing the visual search is described in FIG. 3A.

Proceeding to box 351, the object search application 209 can transmit search results data and search results interface data to the client device 100. The search results data can include the search result items 117. The search results interface data can include data for generating the search results interface 103, such as the upload UI component 116, the edit object component 121, and other suitable components.

Moving on to box 353, the object search application 209 can receive an indication that the user has manipulated (e.g., clicked, tapped, or selected) the upload UI component 116 for uploading user content 235. In some embodiments, the object search application 209 can receive data from the client device 100 that indicates an entry name for the user content 235, for example, as "New Entry" is displayed in FIG. 1B. The entry name data can be retrieved from a user interface displayed on the client device 100.

Next, with regard to box 356, the object search application 209 can transmit input interface data to the client device 100. The input interface data can include the search trigger area 133, the manage component 148, the content entry area 136, the media attachment component 154, and other suitable user interface features.

Referring next to box 359, the object search application 209 can receive the user content 235 from the client device 100. The user content 235 can include text, a hyperlink, a media file 236 (e.g., an image file, a video file, an audio file), and other suitable user content. In some embodiments, the hyperlink can be activated to display a website (e.g., product webpage or a social media posting) that has a media item 119.

Moving on to box 362, the object search application 209 can store the user content 235 for the object 113. In some embodiments, the user content 235 can be stored in association with the object record 216 and/or the media file record 219 for the object. Then, the depicted process ends, although the object search application 209 could continue execution to perform other functions.

Figure 3C:
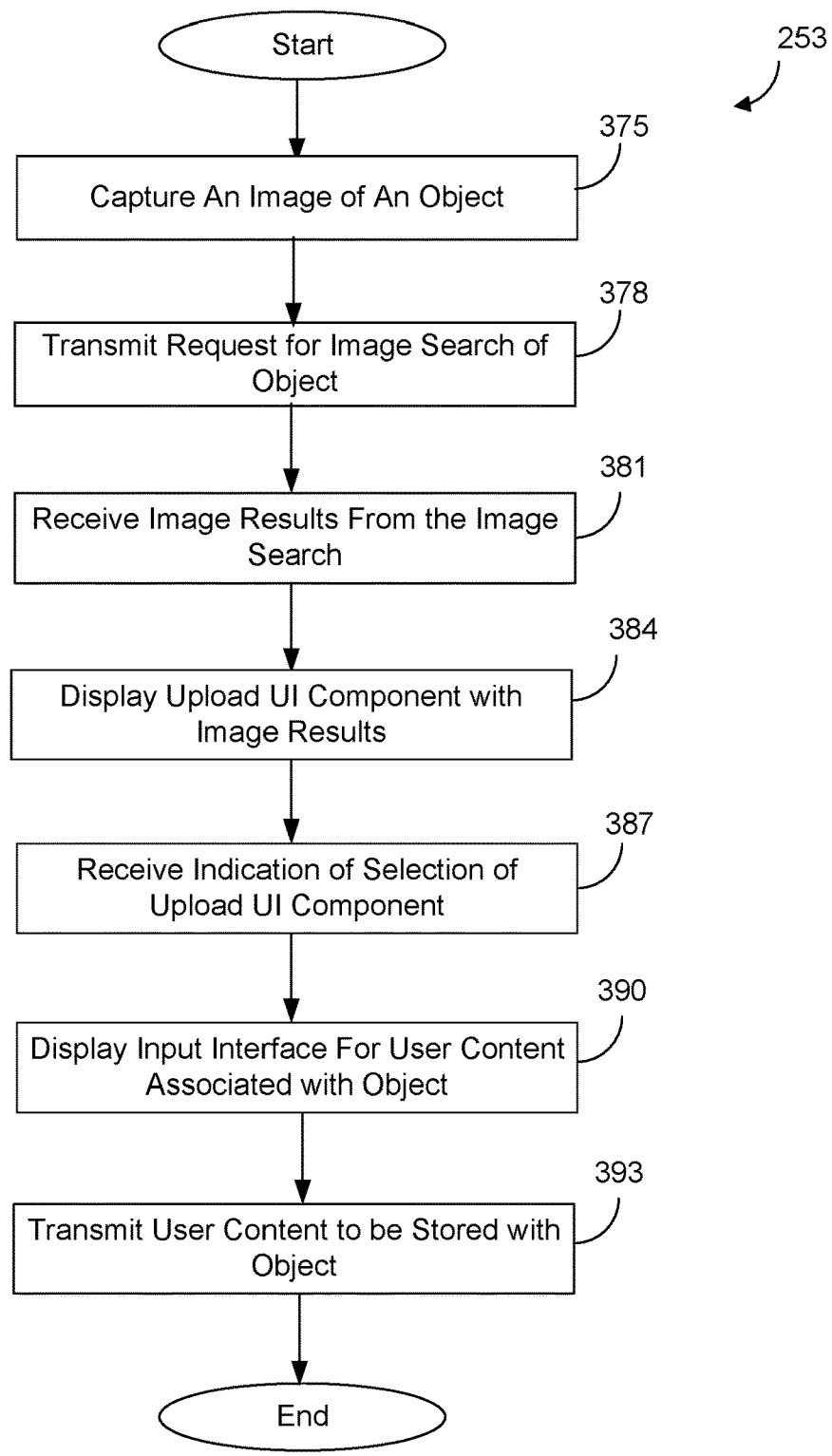

Referring next to FIG. 3C, shown is a flowchart that provides one example of the operation of a portion of the client application 253 according to various embodiments. The flowchart of FIG. 3C can represent functionality for search results interface that displays a search results from an image search and displays one or more user interface components for uploading user content associated with an object of the search results. It is understood that the flowchart of FIG. 3C provides merely an example of the many different types of functional arrangements that may be employed to implement the operation of the portion of the client application 253 as described herein. As an alternative, the flowchart of FIG. 3C may be viewed as depicting an example of elements of a method implemented in the computing environment 203 (FIG. 2) according to one or more embodiments.

Beginning with box 375, the client application 253 can use a camera 251 to capture a media file 236 (e.g., an image or a video) of an object 113 for an image search. In some examples, the media file 236 captured can be manipulated into a cropped media file 107 of the object 113. In some scenarios, this step is omitted and the client device 100 retrieves a media file 236 from its memory.

Next, with regard to box 378, the client application 253 can transmit to the computing environment 203 (e.g., the object search application 209) a request for an image search (e.g., a visual search) of the object 113. The request can include the media file 236 that displays the object 113.

Referring to box 381, the client application 253 can receive from the computing environment 203 one or more image results (e.g., search result items 117) in response to the request for the image search of the object 113. The search result items 117 can include one or more media items 119, text (e.g., user reviews 120), and other related media items from the image search.

Moving on to box 384, the client application 253 can display a search results interface 103. The search results interface 103 can display the image results from the image search, in which the object 113 was a search input parameter (e.g., a search trigger). The search results interface 103 can also include an upload UI component 116 for uploading user content 235 for the object 113. The search results items 117 can include one or more media files 236 that contain the object 113 or a similar object 113.

Next, with regard to box 387, the client application 253 can receive an indication of a selection of the upload UI component 116 by the user. In some embodiments, a user interface can be displayed for naming a new entry of user content 235. For example, the user may name the new entry "New Entry," as shown in FIG. 1B.

At box 390, the client application 253 can display the input interface 130 for receiving the user content 235. The name of the new entry can be displayed on the input interface 130. The input interface 130 can also display a share component 139, an invite component 142, a search trigger area 133, and a content entry area 136. The input interface 130 can receive user content 235, such as text, media items, and other suitable content from the user.

Referring to box 393, the client application 253 can transmit the user content 235 to the computing environment 203. The user content 235 can be stored in association with the object 113 for subsequent image searches of the object 113 by other client devices 100.

Figure 4:
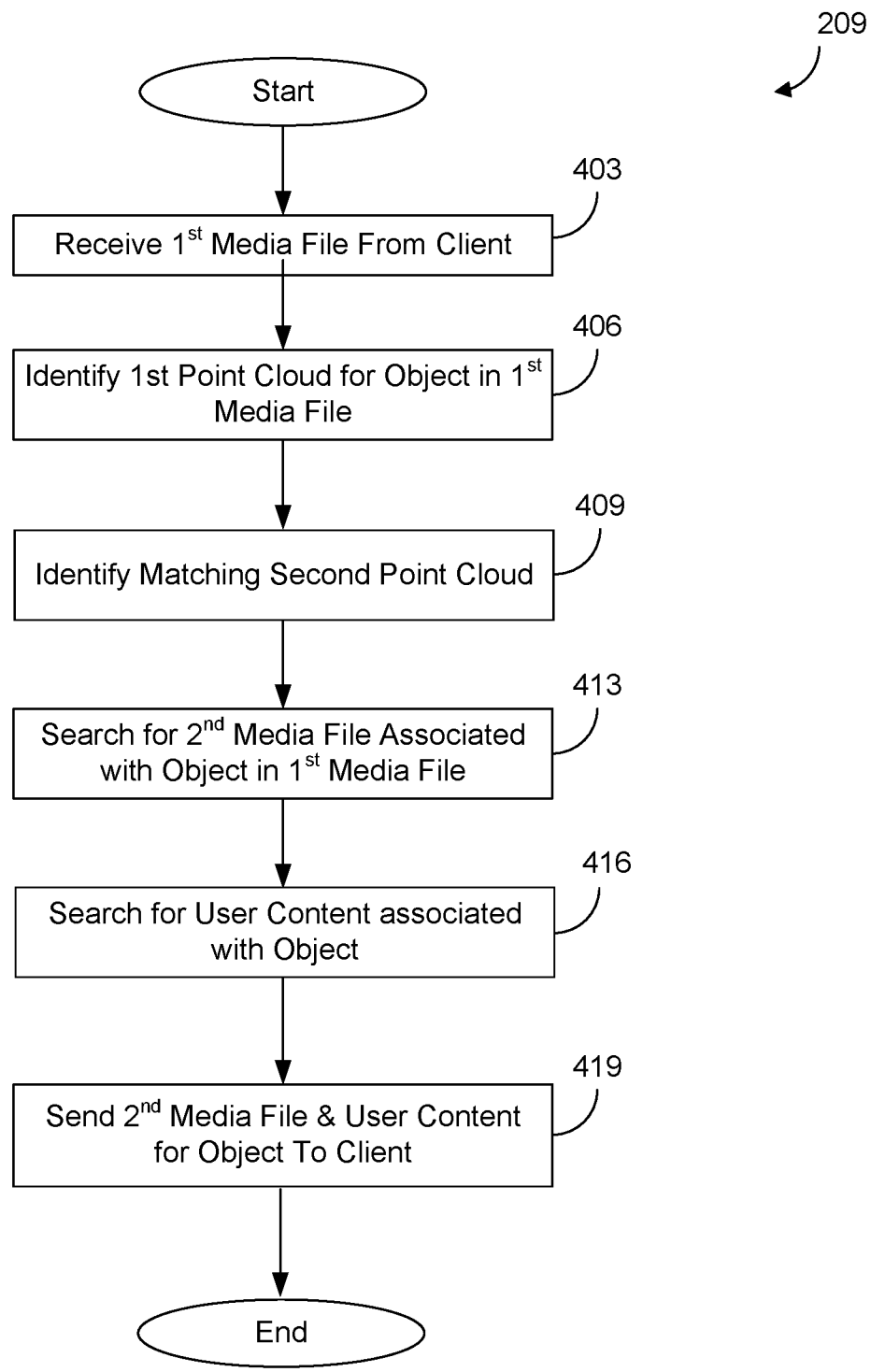
FIG. 4 is a flowchart illustrating one example of functionality implemented as portions of an application executed in a computing environment in the networked environment of FIG. 2 according to various embodiments of the present disclosure.

In some embodiments, the search results interface 103 can be a media feed for a user account 223 of a social media platform. The media feed can display a plurality of media items 119 in the search results area 109. For example, a user may request an image search of a company logo displayed in the media file 236. Upon receiving the image results, a media feed can be displayed with search results items 117 of various products associated with the company logo. The search results items 117 may be media files 236 that have been uploaded by different client devices 100 of different users. The media files 236 may be images captured by the different client devices of one or more products that have the company logo. Then, the depicted process ends, although the client application 253 could continue execution to perform other functions Referring next to FIG. 4, shown is a flowchart that provides one example of the operation of a portion of the object search application 209 according to various embodiments. The flowchart of FIG. 4 can represent functionality for a user to access user content from a search results interface, in which the user content was uploaded to the computing environment 203 by another user. It is understood that the flowchart of FIG. 4 provides merely an example of the many different types of functional arrangements that may be employed to implement the operation of the portion of the object search application 209 as described herein. As an alternative, the flowchart of FIG. 4 may be viewed as depicting an example of elements of a method implemented in the computing environment 203 (FIG. 2) according to one or more embodiments.

Beginning with box 403, it is assumed the object search application 209 has received user content 235 for one or more users. For example, the user content 235 may be uploaded and associated to one or more objects 113 according to the flowchart of FIG. 3B. At this stage, the object search application 209 may receive a first media file 236 (FIG. 2) from a second client device 100 (FIG. 2). In this example, the second client device 100 is different from a first client device 100 that has uploaded the user content 235 stored in association with the object 113.

Next, with regard to box 406, the object search application 209 can use one or more computer vision techniques to identify individual objects 113 within the first media file 236. For example, the object search application 209 may use various feature detection approaches such as edge detection, corner detection, blob detection, ridge detection, affine invariant feature detection, or similar approaches to identify a collection of features that define an object. Moving on to box 409, the object search application 209 can identify the collection of features of an object 113 in the first media file 236 that matches a collection of features of a known object 113. In some embodiments, the functionality can be similar to the functionality described in FIG. 3A.

Referring next to box 413, the object search application 209 can search for one or more media files 236 related to the identified object 113. For example, the object search application 209 can determine whether the object identifier 226 of the object record 216 matching the identified object 113 matches the object identifiers 226 stored in any media file records 219, in which the functionality can be similar to the functionality described in FIG. 3A.

Next, with regard to box 416, the object search application 209 can search for user content 235 associated with the object 113. Additionally, in some embodiments, the user content 235 can be retrieved based at least in part on an association with the media files 236 that have the object 113. As such, the user content 235 can be retrieved based at least in part on a search for the media file record 219, the object identifier 226, the object record 216, and other suitable means. In some examples, the object search application 209 can search the user content 235 for content that is similar or matches an object 113 of a search.

Moving on to box 419, the object search application 209 can send the second media file 236 and the user content 235 to the client device 100. In some examples, the user content 235 can be retrieved for a feed interface of a social media platform. The feed interface can include a continuous feed of user content 235 associated with a particular object 113. For example, a user can request a visual search of a company logo. The company logo can be identified as the object 113. The object search application 209 can transmit for a display in the continuous feed user content 235 that has been uploaded to multiple client devices 100 on behalf of various users. Then, the depicted process ends, although the object search application 209 could continue execution to perform other functions.

Figure 5:
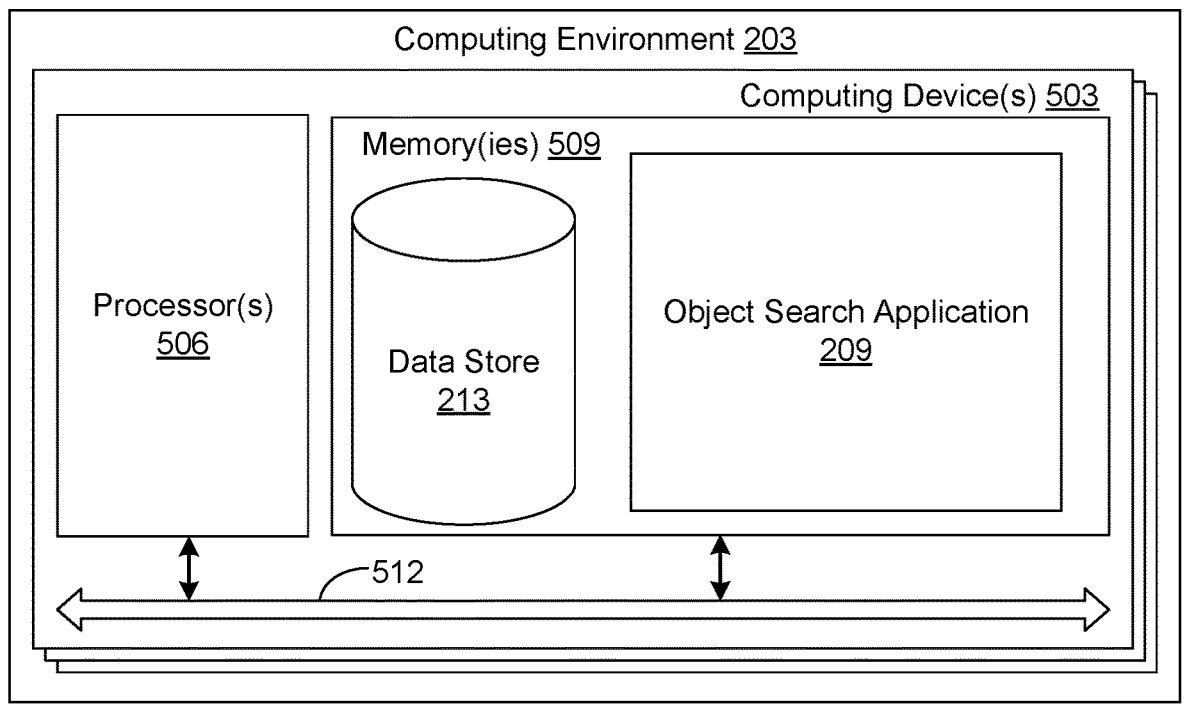
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 is the object search application 209, and potentially other applications. Also stored in the memory 509 may be a data store 213 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although object search application 209, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A, 3B, 3C, and 4 show the functionality and operation of an implementation of portions of the object search application 209. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, 3C, and 4 show a specific order of execution, it is understood that the order of execution may differ from that which is depicted. For example, the order of execution of two or more blocks may be scrambled relative to the order shown. Also, two or more blocks shown in succession in FIGS. 3A, 3B, 3C, and 4 may be executed concurrently or with partial concurrence. Further, in some embodiments, one or more of the blocks shown in FIGS. 3A, 3B, 3C, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the object search application 209, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including object search application 209, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 503, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing machine readable instructions that, when executed by a processor of a computing device, cause the computing device to at least:
   capture an image of an object using a camera;
   transmit to a remote computing device a request for a visual search of the object, the request comprising the image of the object;
   receive from the remote computing device an image result in response to the request for the visual search, wherein the image result comprises the object;
   display a visual search results interface that includes the image result from the visual search and an upload user interface component; and
   display an input interface in response to a selection of the upload user interface component, the input interface having a management component that is configured for adding a media item to a set of items stored in association with the object and configured for removing a particular media item from the set of items stored in association with the object, the set of items being accessible for a subsequent visual search by a plurality of client devices.

2. The non-transitory computer-readable medium of claim 1, wherein the media item comprises at least one of, an image file, or an audio file.

3. The non-transitory computer-readable medium of claim 1, wherein the visual search results interface comprises a cropped media file of the image and a plurality of search result items.

4. The non-transitory computer-readable medium of claim 1, wherein the input interface is configured to receive a hyperlink of the media item, wherein upon activation of the hyperlink the media item is displayed, the hyperlink is transmitted to the remote computing in order for the hyperlink to be stored in association with the object.

5. The non-transitory computer-readable medium of claim 1, wherein the input interface includes an invite component and a sharing component, the sharing component being configured to send an entry of the media item to a different user account, and the invite component being configured to invite a non-registered user to create a user account and view the entry of the media item.

6. A system, comprising:
   a client device comprising a processor and a memory; and
   machine readable instructions stored in the memory that, when executed by the processor, cause the client device to at least:

transmit to a computing device a request for an image search of an object, the request comprising an image of the object;

receive from the computing device an image result in response to the request for the image search, wherein the image result comprises the object;

display an image search results interface that includes the image result from the image search and a selectable component; and display an input interface for uploading user content associated with the object in the image result in response to receiving a selection of the selectable component, the input interface having a management component that is configured for adding a media item to a set of items stored in association with the object and configured for removing a particular media item from the set of items stored in association with the object.

7. The system of claim 6, wherein
the input interface comprises a text window for receiving a text input.

8. The system of claim 6, wherein the machine readable instructions, when executed by the processor, cause the client device to at least:

transmit the user content to the computing device, wherein the user content is stored in association with the object in the image result, wherein the user content is configured to be displayed in association with a second image result for a second client device.

9. The system of claim 6, wherein the input interface comprises an attachment component that is configured for uploading the media item in association with the object in the image result.

10. The system of claim 7, wherein the input interface includes the image result from the image search results interface and a sharing component, the sharing component being configured to send an entry of the user content to a different user account.

11. The system of claim 10, wherein the image result is a cropped image of a larger image that includes the object.

12. The system of claim 6, wherein the user content comprises at least one of text, an image file, an audio file, or a hyperlink of a webpage.

13. The system of claim 6, wherein the image search results interface includes a search results area that includes the image result from the image search.

14. The system of claim 6, wherein the image search results interface is a media feed for a user account on a social media platform.

15. A computer-implemented method, comprising:

identifying, by a client device, an image of an object;

transmitting, by the client device, a request for an image search of the object to a computing device, the request comprising the image of the object;

receiving, by the client device, an image result from the computing device in response to the request, the image result comprising the object;

displaying, by the client device, an image search results interface that includes the image result and a user interface component; and displaying, by the client device, an input interface for uploading user content associated with the object in the image result in response to receiving a selection of the user interface component, the input interface having a management component that is configured for adding a media item to a set of items stored in association with the object and configured for removing a particular media item from the set of items stored in association with the object.

16. The method of claim 15,
wherein the input interface displays a search trigger media item, the search trigger media item representing a basis for generating at least one search descriptor for the object, associated with the object.

17. The method of claim 16, further comprising:

transmitting, by the client device, the user content to the computing device, wherein the user content is stored in association with the object in the image result, and the user content is configured to be displayed for a subsequent image second for a second client device.

18. The method of claim 15, wherein identifying the image of the object comprises:

capturing, by the computing device, the image of the object using a camera.

19. The method of claim 15, wherein the user content comprises at least one of text, an image file, an audio file, or a hyperlink of a webpage.

20. The method of claim 15, wherein the image search results interface is a media feed for a user account on a social media platform, wherein the media feed includes a plurality of media items retrieved from a plurality of different social media platforms.

* * * * *